United States Patent [19]

Stiker et al.

[11] 4,180,441

[45] Dec. 25, 1979

[54] PROCESS FOR MAKING NEGATIVE ELECTRODES FOR ELECTROCHEMICAL GENERATORS, AND THE NEGATIVE ELECTRODES THUS OBTAINED

[75] Inventors: Bernard Stiker, Paris; Fernand Jolas, Rueil Malmaison, both of France

[73] Assignee: Societe les Piles Wonder, France

[21] Appl. No.: 908,783

[22] Filed: May 23, 1978

[30] Foreign Application Priority Data

May 24, 1977 [FR] France .................. 77 15843

[51] Int. Cl.² ................... C25C 5/02; C25C 1/16
[52] U.S. Cl. ...................... 204/2.1; 204/10; 204/96
[58] Field of Search .............. 204/2.1, 10, 28, 96

[56] References Cited

U.S. PATENT DOCUMENTS

| | | |
|---|---|---|
| 3,222,128 | 12/1965 | Sooryn .................. 204/10 |
| 3,326,721 | 6/1967 | Henderson et al. ......... 204/10 |
| 3,400,056 | 9/1968 | Hills .................... 204/10 |
| 3,558,359 | 1/1971 | Jost ..................... 204/2.1 |

Primary Examiner—T. M. Tufariello
Attorney, Agent, or Firm—Ostrolenk, Faber, Gerb & Soffen

[57] ABSTRACT

A relatively little adherent and fragile powdery layer is deposited on a continuous metallic tape or strip by passing continuously said tape negatively polarized through an electrolytic bath contained in a vat and containing ions of the active metal to be deposited; in the bath is immersed an electrode made out of active metal and a compensation electrode; the powdery layer is consolidated by means of a calender.

Said process is applicable to the manufacture of cadmium or zinc negative electrodes for electrochemical generators.

7 Claims, 1 Drawing Figure

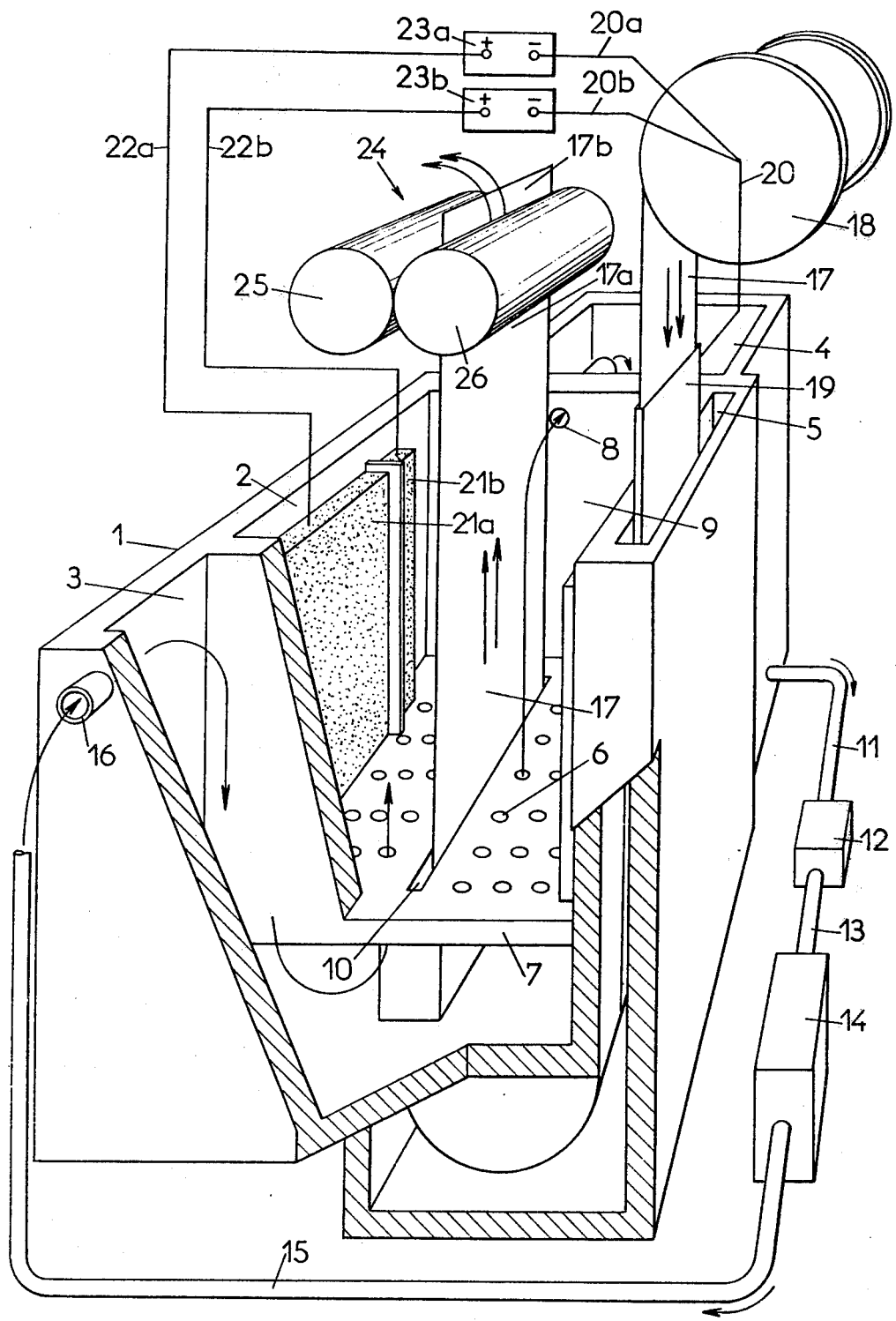

PROCESS FOR MAKING NEGATIVE ELECTRODES FOR ELECTROCHEMICAL GENERATORS, AND THE NEGATIVE ELECTRODES THUS OBTAINED

BACKGROUND OF THE INVENTION

The present invention relates to negative electrodes for electrochemical generators, more particularly to negative electrodes made out of cadmium or zinc for generators in an alkaline, neutral or acid medium.

As regards the cadmium electrodes used substantially as negative plates in alkaline nickel-cadmium and silver-cadmium generators, it is known how to prepare them by means of three types of processes (the third of which is also applicable to the zinc electrodes), namely, 1. The process whereby a conductive porous support or core is repeatedly immersed, consisting in immersing a support, generally in sintered nickel, in melted cadmium nitrate, and thereafter in an aqueous solution of an alkaline metal hydroxide which transforms said nitrate in cadmium hydroxide. The pores of the cadmium hydroxide conductive support forming the active material are thereby filled up. Of course, the two immersion operations are repeated several times for providing a sufficient deposit of active material so that the electrode reaches its required capacity, that is, in operation, is capable of storing the required electricity quantity.

Excellent cadmium electrodes are thereby obtained, but their cost of production is very high.

2. The process whereby a non-porous conductive support or core is coated with a powder and consisting in coating, for instance, through compacting or impasting with a cadmium base and/or a cadmium compound powder, a non porous conductive support made, for instance, of a metallic gauze or a perforated plate.

This second process is more economical than the first, but the electrodes which it provides cannot support high loading or unloading conditions and their thickness cannot be very thin, which is often a disadvantage.

3. The process whereby cadmium and/or cadmium hydroxide is directly electro-deposited on a support or core, porous or non porous, consisting in cathodically polarizing said support while immersing it in a solution of at least one cadmium salt.

Such a process provides at a relatively low cost, good quality cadmium electrodes withstanding high ratings, such as the electrodes obtained through the first process, and which may be very thin.

Generally, according to how the electrodeposition is being performed, three types of electrolytic metallic deposits may be made:

(a) an adherent deposit, compact and without porosities, obtainable through conventional electroplating; it should be noted that it is also possible to obtain a zinc deposit of this type; such cadmium or zinc deposits are convenient for providing protective platings, but not negative electrodes, since they resume their passivity as the metal is not in a divided state;

(b) an electrolytic deposit, adherent and porous, usable for making electrodes; a process of this type, which is the object of French Pat. No. 1,281,247 filed on July 6, 1960 by YARDEY INTERNATIONAL CORPORATION, consists in electrolytically depositing an active metal on the cathodic surface from a highly ionized solution containing a large proportion of ions others than those of said active metal, the active metal ions being present in solution in a proportion lower than about 10% by weight; the active metal can be cadmium or zinc for forming negative electrodes, or silver for forming positive electrodes; the porous deposits on electrodes, in particular on negative electrodes, obtained by a process of such type offer the disadvantage of having a far lower reactive power than deposits in powder form obtained by other processes and, moreover, this reactive power decreases after repeated cyclings; therefore, they do not provide very good quality electrodes;

(c) a powdery deposit, of fine texture and little adherent, usable for preparing metallic powders; such powders are very reactive since very divided, but the deposit offers the disadvantage of being little adherent, heterogeneous and fragile, whereby it cannot be used for forming the active part of an electrode.

SUMMARY OF THE INVENTION

The present invention has for an object to provide such powdery deposits with a very fine texture, but adherent, homogeneous and not fragile, while being very reactive.

The invention has also for an object to provide a manufacturing process of a material coated with a deposit of an active metal for making negative electrodes for electrochemical generators, characterized in that a powdery layer, relatively little adherent and fragile, is deposited on a continuous metallic tape or strip by passing continuously said metallic tape, negatively polarized, through an electrolytic bath containing ions of the active metal to be deposited, the bath being disposed in an electrolysis vat with an electrode in said active metal, and preferably also an electrode in a non active metal, while ensuring, according to an important characteristic of the invention, a laminar flow of the bath in the whole area of the vat comprising said tape and said electrode or electrodes which are positively polarized, and said powdery layer being consolidated by subjecting said tape coated with the powdery layer, when coming out from said bath, to a calendering operation.

It is a further object of the invention to provide a device for realizing the deposit of a layer of an active metal on a continuous tape or strip by using the aforementioned process and characterized in that it comprises, on the one hand, an electrolysis vat comprising a main electrodeposition compartment containing an electrolytic bath with ions of the active metal to be deposited into which dips an electrode of said active metal, and preferably also an electrode of non active metal, an input compartment for the arrival of the electrolytic bath, communication means between said input compartment and said electrodeposition compartment for causing to flow passing in laminar fashion the electrolytic bath from the input compartment to the electrodeposition compartment, an output compartment, means for providing the overflow of the electrodeposition compartment into the output compartment, preferably means for recycling the electrolytic bath from the output compartment into the input compartment, means for circulating continuously in the electrodeposition compartment and through the electrolytic bath contained therein the continuous tape upon which the active metal layer has to be deposited, and means for negatively polarizing said tape and positively polarizing said electrode or electrodes, and, on the other hand, a calendar arranged in the vicinity of the electrodeposition department of the vat and means for forwarding said tape at the output of the electrodeposition compartment through the cylinders of said calendar.

Another object of the invention is to provide, as a new article of manufacture, a material coated with an active metal deposit, in particular of cadmium or zinc, and adapted to constitute negative electrodes for electrochemical generators, characterized in that it has been obtained by using the process hereabove defined, in particular in the device also hereabove defined; this material is capable, in thicknesses lower than 1 mm, of possessing faradic capacitances reaching up 100 mAh/cm$^2$.

In any case, the invention will become more apparent from the following description made in connection with the accompanying drawing.

BRIEF DESCRIPTION OF THE DRAWING

The sole FIGURE shows, in perspective, with parts torn away, a device according to the invention, given by way of a non limitative example, for practicing the process according to the invention.

DESCRIPTION OF THE PREFERRED EMBODIMENT

As shown in the sole figure, the device comprises firstly an electrolysis vat 1 comprising four compartments, viz. an electrodeposition compartment 2, an input and filling compartment 3, an output or overflow compartment 4 and a compartment 5 of a smaller dimension and called access compartment. The electrodeposition compartment 2 communicates with the input compartment 3 through a number of holes 6 formed in the bottom 7 of the electrodeposition compartment 2; it communicates with the output compartment 4 through an overflow opening 8, formed in the upper portion of wall 9 separating compartments 2 and 4; finally it communicates with the access compartment 5 via an elongated rectangular slot 10 extending across the bottom 7.

The unit formed by compartments 2, 3 and 5 is filled with an electrolyte (not shown) up to the level of hole 8 formed in wall 9; as regards compartment 4, it is not filled up to that level since a recycling system has been foreseen between the base of compartment 4 and the top of compartment 3, said recycling system comprising a piping 11 communicating upstream with the lower portion of compartment 4, a recycling pump 12, a piping 13, a cooling chamber 14 and a piping 15 emerging at 16 in the upper portion of compartment 3, the recycling system having as effect not only to bring back the electrolyte from the bottom of the output compartment 4 up to the upper portion of the input compartment 3, but also to cool the electrolyte which has a tendency of heating up when the electrolysis vat 1 is operating. The circulation of the electrolyte is shown by a simple arrow.

The electrolyte is an acid or an alkaline electrolyte containing ions of an active metal; thus, it may be formed of a dilute aqueous solution of cadmium sulfate and sulphuric acid when cadmium is to be deposited or a dilute solution of zinc oxide in a concentrated aqueous solution of potash for forming a zinc deposit.

The material to be coated is formed of a continuous tape or strip 17 fed by a supply spool 18 on which it is wound. The tape 17 passes across compartment 5 filled with the electrolyte but not subjected to the lines of electric field, then it penetrates through slot 10 in the electrodeposition department 2 in which it receives the active metal deposit.

On the other hand, tape 17 is negatively polarized by sources 23a and 23b of the continuous current due to a guide 19 connected by conductors 20, 20a, 20b to the negative poles of sources 23a and 23b.

In compartment 2 are arranged two electrodes, namely the main electrode 21a in active metal, that is in cadmium or zinc, and an auxiliary regulation electrode 21b in an inert metal compatible with the medium, for instance in lead in an acid medium (sulphuric acid and cadmium sulfate) for the deposit of cadmium, in nickel in alkaline medium (potash and zinc oxide) for the zinc deposits. The electrodes 21a and 21b are positively polarized by being respectively connected through conductors 22a and 22b to the positive poles of sources 23a and 23b respectively. The function of electrode 21a in active metal is to maintain the concentration of active metal ions of the electrolyte (not shown) which is in the vat, by playing the role of a soluble anode, while the electrode 21b acts as a regulation means.

During the electrolysis, the dissolution efficiency of the soluble anode 21a is in fact of the order of 100%, whereas the efficiency of the deposit on the tape is only of a %, for instance 80% in the case of cadmium and 95% in the case of the zinc deposit. Under such conditions, if the same current intensity was applicable to the soluble anode 21a and to the tape 17, there would be an accumulation of active metal in the bath. Due to the existence of two sources 23a and 23b and of the electrode 21b in a metal which is not partaking to the electrodeposition process, said disadvantage is being mitigated; to this effect, and supposing a efficiency of 80% for the deposit of active metal, 20% of the intensity of the current applied to tape 17 is applied to electrode 21b, whereas the 80% of said current intensity will be applied to the soluble electrode 21a; more generally, if the electrodeposition efficiency was of a %, the source 23a would apply a % of the current intensity applied to tape 17, to the soluble electrode 21a, while the source 23b would apply (100−a) % of the current intensity applied to tape 17, to the inert electrode 21b, the total current intensity applied to tape 17 corresponding to 100%.

On the other hand, hydrogen is liberated from tape 17 in compartment 2, said liberation having the advantage of making powdery the active metal deposit on tape 17; the electrode 21b, in inert metal, oxidizes the bath water, whereby an oxygen discharge appears on its surface with the generation of hydrogen ions, the latter being produced in a quantity equal to that of the hydrogen ions which are eliminated in the form of hydrogen gas on the surface of tape 17.

Finally, the device of the single figure comprises also a calendar 24 comprising two rotary cylinders 25 and 26 arranged just above compartment 2 in vat 1, the tape 17a coated with an active metal deposit being driven by the rotation of cylinders 25 and 26. The gap between cylinders 25 and 26 compresses further the active deposit deposited on the tape thereby providing the final tape 17b which is usable for making negative electrodes for electrochemical generators. In the drawing has been shown with double arrows the advance direction of the tape.

The operation of the device just described is the following.

The calendar 24 (or any other convenient means) draws tape 17, 17a in the direction of the double arrow in succession through guide 19 which polarizes it cathodically, the access compartment 5 in which it is wetted by the electrolyte, the compartment 2 in which it is subjected to the electrolysis phenomenon and receives a spongy deposit of cadmium, and between the cylinders 25 and 26 of calendar 24 in which the deposit is being compressed and consolidated. Tape 17b with its consolidated cadmium or zinc layer can be thereafter subjected to various operations, in particular to an improvement chemical treatment, to a washing and/or a drying, for instance as described in the French patent application filed this same day by the Applicant for a "process for improving the quality of electrodeposited negative electrodes for electrochemical generators and negative electrodes obtained by said process".

As regards more particularly the electrolysis, said electrolysis consists, as already discussed:

in a dissolution of anode 21a with passage of active metal in the electrolyte with an efficiency of nearly 100%;

an emission of oxygen at anode 21b;

the formation of hydrogen ions at anode 21b;

a deposit of active metal, cadmium or zinc, on tape 17 with an efficiency lower than 100%;

a hydrogen emission on the spongy deposit of active metal.

For the reasons hereabove explained, it is possible to regulate the active metal content of the electrolyte. On the contrary, there is a loss of water through electrolysis with emission of hydrogen on tape 17a with its deposit, and an emission of oxygen on the inert electrode 21b. It is therefore necessary to provide the controlled addition of water, for instance, by means of an electrovalve (not shown) which introduces in vat. 1, 0.3357 grams of water per amp-hour having flown across inert electrode 21b.

Due to the inert electrode 21b and the electrovalve, there is provided an excellent regulation of the electrolyte composition.

As regards the tape, it may be made of a full or perforated metallic plate, in expanded metal, in metallic gauze, the metal being for instance nickel, nickelled iron, silver, or zinc. Two examples of how the invention can be practiced will now be given in order to provide respectively cadmium and zinc deposits.

EXAMPLE 1: active cadmium deposit

The tape or strip 17 is a pure nickel tape, perforated, of a thickness of 0.1 mm and a width of 14 cm.

The electrolyte is constituted by a dilute aqueous solution of cadmium sulfate and sulphuric acid with 10 to 100 g/l of $Cd^{++}$ (for instance 20 g/l) and from 10 to 100 g/l (for instance 50 g/l) of $H_2SO_4$.

The current density is within 50 to 1000 $mA/cm^2$, for instance 230 $mA/cm^2$.

The temperature of the electrolyte is comprised between 5° C. and 75° C.; it is a function of the current density (for instance 18° C. at 230 $mA/cm^2$).

The tape speed is of the order of one meter per hour (for instance 2 m/h) and that of the electrolyte bath of the order of one meter per minute (for instance 1.5 m/mn).

The distribution of the anodic current is: 80% on the cadmium soluble anode 21a and 20% on the lead inert anode 21b.

The thickness of the cadmium deposit at the output of vat 1 is of 3 mm about; the calendering reduces said thickness to 0.5 mm, that is a compacting rate of over 80%, the apparent density of the deposited cadmium being lower in this example than almost 34% of the massive cadmium density.

EXAMPLE 2: active zinc deposit

The tape or strip 17 is made of expanded zinc.

The electrolyte is constituted by a zinc oxide and potash aqueous solution containing from 5 to 10% of ZnO and from 30 to 45% of KOH (for instance 45% of KOH and 8% of ZnO).

The current density is between 50 and 1000 $mA/cm^2$ (for instance 200 $mA/cm^2$).

The electrolyte temperature lies between 5° C. and 75° C.; its depends on the current density (for instance 25° C. at 200 $mA/cm^2$).

The distribution of the anodic current is of 95% on the zinc soluble anode 21a and 5% on the nickel inert anode 22b.

The thickness of the zinc deposit at the output of vat 1 is of 4 mm; calendering reduces said thickness to 0.2 mm. The compacting rate in this example is over 90% and the apparent density of the deposit of zinc is lower in this example than about 26% of the massive zinc density.

There is provided by the process of a invention the deposit of a porous active layer having an excellent behaviour on its support, the assembly of the deposited layer and support being cuttable for forming a negative electrode, eventually after an improvement treatment according to the process which is the object of the aforementioned patent application.

Obviously and as can be assumed from the previous description, the invention is in no way limited to such application modes and embodiments which have been more specially considered; on the contrary, it encompasses all their modifications.

We claim:

1. A manufacturing process for a material coated with an active material deposit for making negative electrodes for electrochemical generators, wherein a powdery layer relatively little adherent and fragile is being deposited on a continuous metallic tape by passing said metallic tape continuously, negatively polarized, through an electrolytic bath containing ions of the active metal to be deposited, the bath being disposed in an electrolysis vat containing an electrode of said active metal, and said powdery layer being consolidated by subjecting said tape coated with a powdery layer, at the outlet of said bath, to a calendering operation, characterized in that there is provided a laminar flow of the bath in the whole area of the vat comprising said tape and the electrode which is positively polarized, and by the fact that said vat comprises also a non-active metal electrode which is also positively polarized, the ratio between the anodic current at the active metal electrode and the total anodic current applied to the two electrodes being substantially equal to the electrodeposition efficiency of the active metal of the tape in the vat.

2. The process according to claim 1, wherein there is added continuously water to the electrolytic bath in a quantity substantially equal to 0.33 grams per amp-hour having passed through said non active metal electrode.

3. The process according to claims 1 or 2, wherein the active metal is cadmium.

4. A tape coated with a deposit of consolidated powdery active metal, for making electrodes, obtained by the process according to claim 1.

5. The tape coated with a deposit of consolidated powdery cadmium, for the manufacture of cadmium electrodes, obtained by the process of claim 3.

6. A tape coated with a deposit of consolidated powdery active metal obtained by the process according to claim 1 constituting an electrode.

7. The tape coated with a deposit of consolidated powdery cadmium obtained by the process of claim 3 constituting a cadmium electrode.

* * * * *